United States Patent
Xiong et al.

(10) Patent No.: US 11,975,757 B2
(45) Date of Patent: May 7, 2024

(54) WALKING DEVIATION CORRECTION METHOD AND DEVICE FOR WORKING MACHINE

(71) Applicant: SHANGHAI SANY HEAVY MACHINERY CO., LTD, Shanghai (CN)

(72) Inventors: Yunfei Xiong, Shanghai (CN); Qinghong Chen, Shanghai (CN)

(73) Assignee: SHANGHAI SANY HEAVY MACHINERY CO., LTD, Shanghai (CN)

( * ) Notice: Subject to any disclaimer, the term of this patent is extended or adjusted under 35 U.S.C. 154(b) by 0 days.

(21) Appl. No.: 18/515,704

(22) Filed: Nov. 21, 2023

(65) Prior Publication Data
US 2024/0083500 A1 Mar. 14, 2024

Related U.S. Application Data

(63) Continuation of application No. PCT/CN2022/095518, filed on May 27, 2022.

(30) Foreign Application Priority Data

Jun. 7, 2021 (CN) .......................... 202110632740.7

(51) Int. Cl.
*B62D 11/00* (2006.01)
*B62D 11/04* (2006.01)
(52) U.S. Cl.
CPC ............ *B62D 11/005* (2013.01); *B62D 11/04* (2013.01)
(58) Field of Classification Search
CPC ............................. B62D 11/04; B62D 11/005
See application file for complete search history.

(56) References Cited

U.S. PATENT DOCUMENTS

2008/0296083 A1\* 12/2008 Krieger ................. E02F 9/2253
180/403
2009/0057040 A1\* 3/2009 Yamada ................ E02F 9/2207
60/420
(Continued)

FOREIGN PATENT DOCUMENTS

CN 1336470 A 2/2002
CN 102720239 A 10/2012
(Continued)

OTHER PUBLICATIONS

International Search Report issued in corresponding PCT Application No. PCT/CN2022/095518, dated Aug. 23, 2022.
(Continued)

*Primary Examiner* — Tony H Winner
(74) *Attorney, Agent, or Firm* — Westbridge IP LLC

(57) ABSTRACT

Disclosed are a walking deviation correction method and a walking deviation correction device for a working machine. The working machine includes: a first pump, a second pump, a first motor and a second motor; the first pump is connected to the first motor, the second pump is connected to the second motor, the first motor is configured to drive a first running wheel, and the second motor is configured to drive a second running wheel. The method includes: receiving a first input from a user; outputting a flow percentage in response to the first input; receiving a second input from the user based on the flow percentage; and adjusting working flow rates of the first motor and the second motor in response to the second input.

10 Claims, 4 Drawing Sheets

(56) References Cited

U.S. PATENT DOCUMENTS

| | | | |
|---|---|---|---|
| 2010/0218494 A1 | 9/2010 | Yasuda et al. | |
| 2014/0090368 A1* | 4/2014 | Bae | B62D 11/005 60/422 |
| 2014/0358354 A1* | 12/2014 | Pierce | B62D 11/005 701/25 |
| 2015/0166103 A1* | 6/2015 | Otto | B62D 1/22 180/6.48 |
| 2019/0351944 A1 | 11/2019 | Singh et al. | |

FOREIGN PATENT DOCUMENTS

| | | | |
|---|---|---|---|
| CN | 103410183 A | 11/2013 |
| CN | 103419782 A | 12/2013 |
| CN | 104930011 A | 9/2015 |
| CN | 104995052 A | 10/2015 |
| CN | 107697066 A | 2/2018 |
| CN | 111255758 A | 6/2020 |
| CN | 111425136 A | 7/2020 |
| CN | 113357212 A | 9/2021 |
| JP | 2003021232 A | 1/2003 |
| JP | 2005096704 A | 4/2005 |

OTHER PUBLICATIONS

Written Opinion issued in corresponding PCT Application No. PCT/CN2022/095518, dated Aug. 23, 2022.
First Office Action issued in counterpart Chinese Patent Application No. 202110632740.7, dated Dec. 27, 2023.

* cited by examiner

WALKING DEVIATION CORRECTION METHOD AND DEVICE FOR WORKING MACHINE

CROSS-REFERENCE TO RELATED APPLICATIONS

The present application is a continuation application of International Application No. PCT/CN2022/095518, filed on May 27, 2022, which claims priority to Chinese Patent Application No. 202110632740.7, filed on Jun. 7, 2021. The disclosures of the above-mentioned applications are incorporated herein by reference in their entireties.

TECHNICAL FIELD

The present application relates to the technical field of working machines, and in particular to a walking deviation correction method and device for a working machine.

BACKGROUND

At present, when a working machine is walking in a straight line, it is easy for the working machine to deviate due to terrain or failure of a walking mechanism of the working machine. When the straight-line deviation occurs, a driver or an operator needs to adjust a lever based on experience to keep the working machine going straight. The deviation of the working machine can easily lead to safety accidents, and the process of adjusting the deviation is complicated, which can seriously affect work efficiency.

SUMMARY

The present application provides a walking deviation correction method and device for a working machine to solve the problem in the related art that the process of adjusting the deviation of the working machine is complicated.

The present application provides a walking deviation correction method for a working machine. The working machine includes: a first pump, a second pump, a first motor and a second motor; the first pump is connected to the first motor, the second pump is connected to the second motor, the first motor is configured to drive a first running wheel, and the second motor is configured to drive a second running wheel. The method includes: receiving a first input from a user; outputting a flow percentage in response to the first input; receiving a second input from the user based on the flow percentage; and adjusting working flow rates of the first motor and the second motor in response to the second input.

According to the walking deviation correction method for the working machine of the present application, the outputting the flow percentage in response to the first input includes: obtaining current values and working pressures of the first pump and the second pump in response to the first input; and outputting the flow percentage according to the current values and the working pressures of the first pump and the second pump.

According to the walking deviation correction method for the working machine of the present application, the outputting the flow percentage according to the current values and the working pressures of the first pump and the second pump includes: calculating the working flow rates of the first motor and the second motor according to the current values and the working pressures of the first pump and the second pump; and outputting the flow percentage based on the working flow rates of the first motor and the second motor.

According to the walking deviation correction method for the working machine of the present application, the adjusting the working flow rates of the first motor and the second motor in response to the second input includes: adjusting current values of the first pump and the second pump in response to the second input; controlling the first pump to adjust the working flow rate of the first motor based on the current value of the first pump; and controlling the second pump to adjust the working flow rate of the second motor based on the current value of the second pump.

According to the walking deviation correction method for the working machine of the present application, the working machine further includes a display screen; the receiving the first input from the user includes: receiving the first input from the user to a first control displayed on the display screen; the outputting the flow percentage includes: displaying the flow percentage on the display screen; the receiving the second input from the user based on the flow percentage includes: receiving the second input from the user to a second control displayed on the display screen; and the adjusting the working flow rates of the first motor and the second motor includes: adjusting the working flow rates of the first motor and the second motor, and displaying the adjusted working flow rates of the first motor and the second motor on the display screen.

According to the walking deviation correction method for the working machine of the present application, the outputting the flow percentage includes: outputting current flow percentages of the first pump and the second pump; or outputting target flow percentages of the first pump and the second pump.

The present application also provides a walking deviation correction device for the working machine, including: a first receiving module configured to receive a first input from a user; a first response module configured to output a flow percentage in response to the first input; a second receiving module configured to receive a second input from the user based on the flow percentage; and a second response module configured to adjust working flow rates of a first motor and a second motor in response to the second input.

The present application also provides a working machine, including: a first pump; a second pump; a first motor connected to the first pump; and a second motor connected to the second pump; and the walking deviation correction device for the working machine as described above. The first motor is configured to drive a first running wheel, and the second motor is configured to drive a second running wheel.

The present application also provides an electronic device, including a memory, a processor, and a computer program stored on the memory and executable on the processor, steps of the walking deviation correction method for the working machine as described above are implemented when the program is executed by the processor.

The present application also provides a non-transitory computer-readable storage medium, a computer program is stored on the non-transitory computer-readable storage medium, and steps of the walking deviation correction method for the working machine as described above are implemented when the computer program is executed by a processor.

In the walking deviation correction method and device for the working machine according to the present application, the method provides reference information for users to adjust the working flow rates of the first motor and the second motor by outputting the flow percentage, which can effectively improve the accuracy and convenience of the walking deviation correction for the working machine, reduce adjustment time for deviation correction, improve work efficiency, and can flexibly adjust according to the current working conditions to achieve deviation correction of the working machine.

BRIEF DESCRIPTION OF THE DRAWINGS

In order to more clearly illustrate the technical solutions in the present application or the related art, the accompanying drawings needed to be used in the description of the embodiments or the related art will be briefly introduced below. Obviously, the accompanying drawings in the following description are only some embodiments of the present application, and those skilled in the art can also obtain other drawings according to the structures shown in these drawings without creative effort.

DETAILED DESCRIPTION OF THE EMBODIMENTS

In order to make the purpose, technical solutions and advantages of the present application clearer, the technical solutions in the present application will be clearly and completely described below with reference to the drawings in the present application. Obviously, the described embodiments are only a part of the embodiments of the present application, rather than all the embodiments. Based on the embodiments in the present application, all other embodiments obtained by those skilled in the art without creative work fall within the protection scope of the present application.

A walking deviation correction method of a working machine according to the present application is described below with reference to FIGS. 1 to 3. The execution subject of this method can be a terminal controller, a cloud terminal, or an edge server.

The working machine can be the working machine that has a walking mechanism such as a truck crane, an excavator, a pile driver, a concrete machinery, a road roller, a mixer truck, a heading machine, a pump truck or a fire truck.

The working machine includes a first pump, a second pump, a first motor and a second motor, the first pump and the second pump are hydraulic pumps for driving the working machine to walk, and the first motor and the second motor are hydraulic motors and are used to convert hydraulic energy provided by the hydraulic pumps connected to them into mechanical energy.

The first pump is connected to the first motor and pumps hydraulic oil to the first motor. The first motor converts the hydraulic energy provided by the first pump into mechanical energy for driving a first running wheel to walk.

Correspondingly, the second pump is connected to the second motor and pumps hydraulic oil to the second motor. The second motor converts the hydraulic energy provided by the second pump into mechanical energy for driving a second running wheel to walk.

Figure 1:
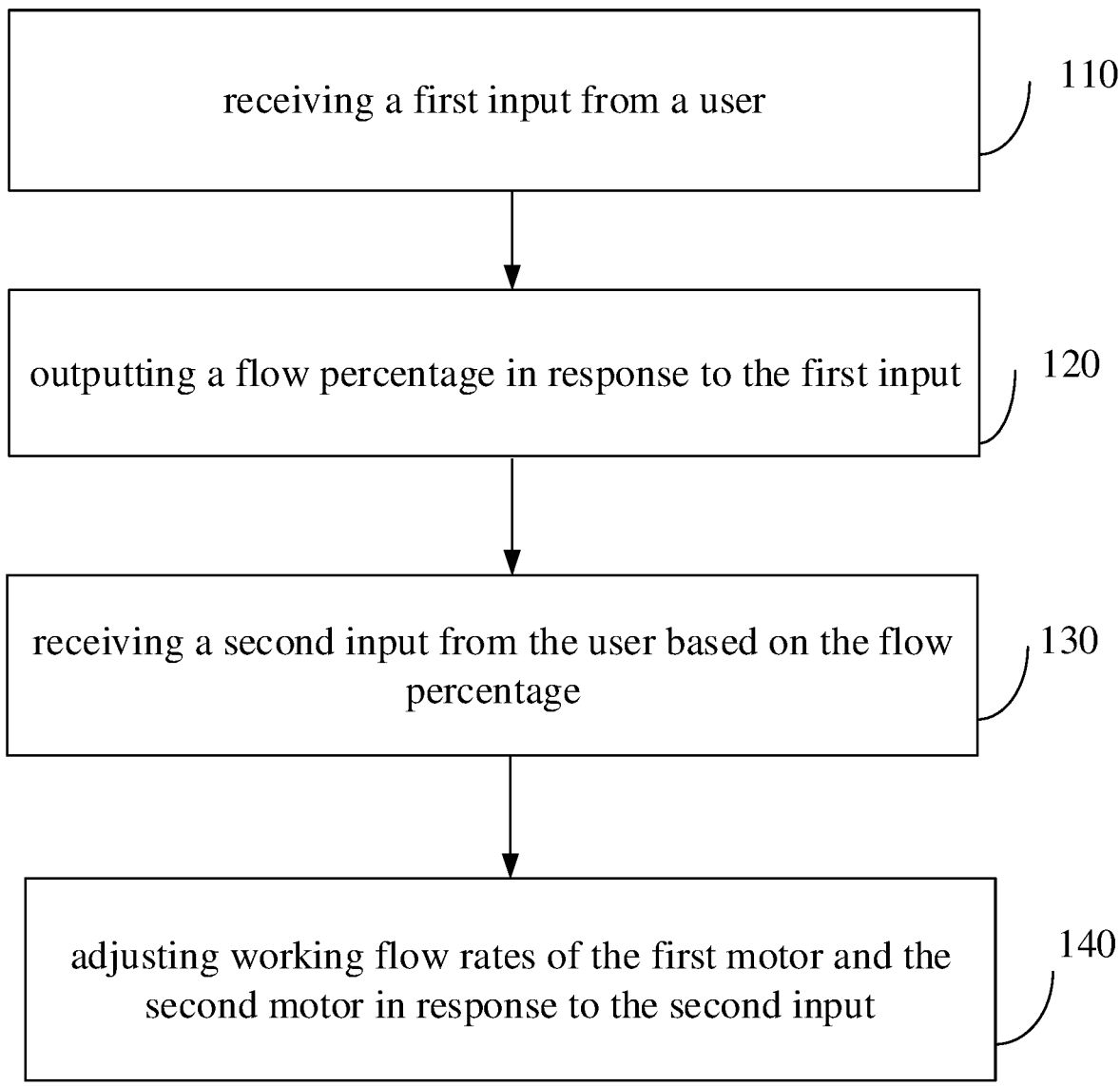
FIG. 1 is a schematic flowchart of a walking deviation correction method for a working machine according to the present application.

As shown in FIG. 1, the walking deviation correction method of the working machine provided by the present application includes: steps 110 to 140.

Step 110, receiving a first input from a user.

It can be understood that the user inputs the first input to a terminal after determining that the current straight walking route of the working machine has deviated.

In this step, the first input is used to control an output flow percentage of the terminal.

The flow percentage is a percentage coefficient of the working flow rates of the first pump and the second pump to the rated value.

For example, the flow percentage of the first pump can be the percentage coefficient of the working flow rate of the first pump to the rated flow rate of the first pump, or can be the percentage coefficient of the working flow rate of the first pump to a sum of the rated flow rates of the first pump and the second pump.

The first input can be expressed in at least one of the following forms:

Firstly, the first input can be a touch input, including but not limited to a click input, a swipe input, a press input, etc.

In this embodiment, receiving the first input from the user can be represented as receiving the first input from the user in a display area of a terminal display screen.

In order to reduce the misoperation rate of the user, the action area of the first input can be limited to a specific area. Alternatively, a target control can be displayed on the current interface and the target control can be touched to realize the first input.

Secondly, the first input can be represented by a physical key input.

In this embodiment, the terminal is provided with a physical button corresponding to the output traffic percentage. Receiving the first input from the user can be expressed as receiving the first input of the user pressing the corresponding physical button.

Thirdly, the first input can be represented as a voice input.

In this embodiment, the terminal can output the flow percentage in the form of text or voice in response to receiving a voice such as "output flow percentage".

In other embodiments, the first input can also be expressed in other forms, including but not limited to character input, etc., depending on actual needs, and the embodiments of the present application are not limited to this.

In the embodiment of the present application, the first input is used to output the flow percentage. Therefore, it is necessary to obtain the working flow rate status of the first motor and the second motor. In the following embodiments, a method for obtaining the working flow rates of the first motor and the second motor will be described in detail from multiple aspects.

Step 120, outputting the flow percentage in response to the first input.

In this step, after receiving the first input, the terminal can output the flow percentage in response to the first input.

It should be noted that the flow percentage is the percentage coefficient of the working flow rate of the first pump and the second pump and the rated value. The user can adjust the first motor and the second motor according to the flow percentage to assist in correcting the walking deviation of the working machine.

The output flow percentage can be expressed in at least one of the following forms.

Firstly, the output flow percentage can be expressed as a display screen output.

In this implementation, the output flow percentage can be represented as displaying the flow percentage on the display screen.

The display area displaying the flow percentage on the display screen can be limited to a specific area. Alternatively, flow display controls for the first motor and the second motor can be displayed on the current interface, and the flow percentage can be output by controlling the color of the controls or the value displayed on the controls.

Secondly, outputting the flow percentage can be expressed as voice output.

In this embodiment, the terminal can issue a voice such as "the flow percentage of first motor is 30% and the flow percentage of the second motor is 30%" and output the flow percentage in response to the first input.

Of course, in other embodiments, the first input can also be expressed in other forms, and the details can be determined according to actual needs, which are not limited in the embodiments of the present application.

Step 130, receiving a second input from the user based on the flow percentage.

Before step 130, the user determines the current working flow rates of the first motor and the second motor based on the flow percentage output by the terminal, and inputs the second input to adjust the working flow rates of the first motor and the second motor.

In this step, the second input is used to adjust the working flow rates of the first motor and the second motor, and adjust the walking speed of the first running wheel and the second running wheel to achieve deviation correction of the working machine.

The second input can be expressed in at least one of the following forms:

First, the second input can be in the form of touch input, including but not limited to click input, swipe input, and press input.

In this embodiment, receiving the second input from the user can be represented as receiving the second input from the user in the display area of the terminal display screen.

In order to reduce the misoperation rate of the user, the action area of the second input can be limited to a specific area. Alternatively, the target control can be displayed on the current interface and the target control can be touched to realize the second input.

Secondly, the second input can be represented as physical key input.

In this embodiment, the terminal is provided with a physical button corresponding to the output flow percentage. Receiving the second input from the user can be expressed as receiving the second input from the user pressing the corresponding physical button.

Thirdly, the second input can be represented as voice input.

In this embodiment, the terminal can adjust the working flow rates of the first motor and the second motor in the form of text or voice in response to receiving a voice such as "adjust the working flow rate of the first motor".

In other embodiments, the second input can also be in other forms, including but not limited to character input, etc.

The specifics can be determined according to actual needs, and are not limited in this embodiment of the present application.

Step 140, adjusting the working flow rates of the first motor and the second motor in response to the second input.

In this step, after receiving the second input, the terminal can adjust the working flow rates of the first motor and the second motor in response to the second input.

It can be understood that the flow percentage is the status information of the working flow rate of the first pump and the second pump, and provides the user with reference information for adjusting the working flow rate of the first motor and the second motor. Based on the second input of the flow percentage, it is possible to improve the accuracy that the user adjusts deviation correction, reduce adjustment time, and improve correction efficiency.

The working flow rate of the first motor and the second motor is the volume of liquid discharged by each rotation. The working flow rate is proportional to the walking speed of the corresponding driven running wheel. For example, the greater the working flow rate of the first motor, the greater the walking speed of the corresponding first running wheel.

It can be understood that the walking speeds of the first running wheel and the second running wheel are inconsistent due to internal faults of the working machine, which may leads to that straight walking of the working machine deviates. Alternatively, the walking speeds of the first running wheel and the second running wheel are consistent, since the working machine is in a working environment with uneven ground, there is also a situation where straight walking of the working machine deviates.

In the related art, by continuously and automatically adjusting the walking speeds of the first and second running wheels to be consistent through closed-loop control, the deviation correction of the working machine can be achieved. This method has poor flexibility and cannot achieve the deviation correction of the working machine when the current ground is uneven.

In the walking deviation correction method provided by the embodiment of the present application, the flow percentage provides the user with status information of the working flow rate of the first motor and the second motor. The working flow rate of the first and second motors is adjusted based on the flow percentage. The working flow rate of the first motor and the second motor is adjusted according to the flow percentage. The user can flexibly adjust according to the current working condition to achieve deviation correction of the working machine.

For example, the working machine is in the working environment with uneven ground. The related technology cannot realize the deviation correction of the working machine by automatically adjusting the walking speed of the first running wheel and the second running wheel to be consistent. In the embodiment of the present application, by outputting the flow percentage, the user can flexibly adjust the working flow rate of the first motor and the second motor, and control the walking speeds of the first and second running wheels to be inconsistent, thereby achieving deviation correction of the working machine.

According to the walking deviation correction method of the working machine provided by the present application, by outputting the flow percentage, reference information can be provided for the user to adjust the working flow rate of the first motor and the second motor, which can effectively improve the accuracy and convenience of the walking deviation correction of the working machine, reduce the adjustment time of deviation correction, improve work efficiency, and flexibly adjust according to the current working conditions to achieve the deviation correction of the working machine.

In some embodiments, at step 120, in response to the first input, current values and working pressure of the first pump and the second pump are obtained; according to the current values and the working pressure of the first pump and the second pump, the flow percentage is output.

In this embodiment, the first pump and the second pump are provided with corresponding proportional solenoid valves. The proportional solenoid valve is a control valve for controlling liquid and gas flow, where the input liquid flow is proportional to an input current signal.

Moreover, corresponding pressure sensors are provided on the first pump and the second pump for measuring the working pressure of the first pump and the second pump.

The current values and the working pressure of the first pump and the second pump are characteristic parameters of the hydraulic energy output by the first pump and the second pump. The first pump is connected to the first motor, and the second pump is connected to the second motor. The first pump and the second pump output and provide the hydraulic energy to the first motor and the second motor.

According to the current values and working pressure of the first pump and the second pump, the flow percentage is output, which can directly characterize the difference in the output hydraulic oil flow between the first pump and the second pump. According to the flow percentage, the working flow rate of the first motor and the second motor is adjusted, which improves the accuracy and convenience of the walking deviation correction of the working machine.

In some embodiments, the working flow rate of the first motor and the second motor is calculated according to the current values and the working pressure of the first pump and the second pump; and based on the working flow rate of the first motor and the second motor, the flow percentage is output.

It can be understood that the output hydraulic oil flow of the first pump and the second pump can be obtained by obtaining the current values and working pressures of the first pump and the second pump. The output hydraulic oil flow of the first pump and the second pump is the hydraulic oil flow input by the first motor and the second motor.

According to the current values and working pressures of the first pump and the second pump, the working flow rate of the first motor and the second motor is calculated, and the flow percentages are output, which can directly represent the difference in the walking speed between the first running wheel and the second running wheel. According to this flow percentage, the adjustment of the working flow rate of the first motor and the second motor is more intuitive and accurate.

In some embodiments, at step 140, the working flow rate of the first motor and the second motor is adjusted in response to the second input.

The second input is an input instruction for the user to adjust the working flow rate of the first and second motors based on the flow percentage.

The flow percentage is the difference in the working flow rate between the first pump and the second pump. The user adjusts the working flow rate of the first motor and the second motor according to the flow percentage to realize the walking deviation correction of the working machine.

In actual implementation, the output flow percentage can be expressed in at least one of the following forms.

Firstly, the output flow percentage is the current flow percentage of the first pump and the second pump.

In this embodiment, the terminal responds to the first input, and the flow percentage output is the current output flow percentage of the first pump and the second pump, which represents the difference in the current output flow between the first pump and the second pump.

It can be understood that the flow percentage is a percentage coefficient between the working flow rate of the first pump and the second pump and the rated value, and is also a percentage coefficient characterizing the difference in the working flow rate of the first motor and the second motor.

The rated value as the rated working flow rate of the first pump or the second pump is taken as an example.

At step 120, outputting the flow percentage in response to the first input.

The current flow percentage of the first pump is 50%, which means that the current working flow rate of the first pump is 50% of the rated working flow rate of the first pump; the current flow percentage of the second pump is 60%, which means that the current working flow rate of the second pump is 60% of the rated working flow rate of the second pump.

The rated value as the sum of the rated working flow rate of the first pump and the second pump is taken as an example.

At step 120, outputting the flow percentage in response to the first input.

The current flow percentage of the first pump is 40%, and the current flow percentage of the second pump is 60%, which means that the current working flow rate of the first pump is 40% of the sum of the rated working flow rate of the first pump and the second pump, and the current working flow rate of the second pump is 60% of the sum of the rated working flow rate of the first pump and the second pump.

It can be understood that when the rated value is the sum of the rated working flow rates of the first pump and the second pump, and the sum of the current flow percentages of the first pump and the second pump is 1, it is possible to choose to increase the flow rate of one of the pumps, or choose to decrease the flow rate of the other pump, thereby realizing the walking deviation correction of the working machine.

Secondly, the output flow percentage is a target flow percentage of the first pump and the second pump.

In this embodiment, the terminal outputs a flow percentage that is the target flow percentage of the first pump and the second pump in response to the first input. The target flow percentage is the recommended adjustment value for adjusting the working flow rate of the first motor and the second motor. The user directly inputs the second input for adjusting the working flow rate of the first motor and the second motor according to the target flow percentage, without determining the difference in the working flow rate between the first motor and the second motor, which makes the walking deviation correction process more convenient.

During specific implementation, when the output target flow percentage is set to a positive value, it means that the working flow rate of the corresponding pump is adjusted upward; when the output target flow percentage is set to a negative value, it means that the working flow rate of the corresponding pump is adjusted downward.

The rated value as the rated working flow rate of the first pump or the second pump is taken as an example.

At step 120, in response to the first input, the flow percentage is output.

The target flow percentage of the first pump is 10%, which means that the second input can be input to adjust the current working flow rate of the first pump up by 10%; the target flow percentage of the second pump is 10%, which means that the second input can be input to adjust the current working flow rate of the second pump up by 10%.

Taking the rated value as the sum of the rated working flow rates of the first pump and the second pump as an example.

The target flow percentage of the first pump is 10%, and the target flow percentage of the second pump is −10%, which means that the second input can be input to adjust the current working flow rate of the first pump up by 10%, and adjust the current working flow rate of the first pump down by 10%.

At step 140, in response to the second input, the current values of the first pump and the second pump are adjusted, thereby adjusting the working flow rates of the first motor and the second motor.

The first pump is connected to the first motor, and the current value of the first pump is adjusted. The first pump is controlled to adjust the working flow rate of the first motor based on the current value of the first pump.

The second pump is connected to the second motor, and the current value of the second pump is adjusted. The second pump is controlled to adjust the working flow rate of the second motor based on the current value of the second pump.

It can be understood that adjusting the current values of the first pump and the second pump means adjusting the current values of the corresponding proportional solenoid valves on the first pump and the second pump, thereby achieving control and adjustment to the hydraulic oil flow output by the first pump and the second pump.

Taking step 120 as an example, the output flow percentage is the current flow percentage of the first pump and the second pump, and the rated value is the sum of the rated working flow rates of the first pump and the second pump.

The current flow percentage of the first pump is 40%, and the current flow percentage of the second pump is 60%. The user adjusts the current values of the first pump and the second pump based on the output flow percentage.

The corresponding input is the second input that adjusts the current value of the first pump upwards or adjusts the current value of the second pump downward.

In response to the second input, the current value of the first pump is adjusted, the first pump is controlled to adjust the working flow rate of the first motor, the current value of the second pump is adjusted, and the second pump is controlled to adjust the working flow rate of the second motor, thereby realizing the walking deviation correction of the working machine.

Taking step 120 as an example, the output flow percentage is the target flow percentage of the first pump and the second pump, and the rated value is the sum of the rated working flow rates of the first pump and the second pump.

The target flow percentage of the first pump is 10%, and the current flow percentage of the second pump is −10%. Based on the prompt of the output target flow percentage, the user adjusts the current values of the first pump and the second pump, and adjusts the current value of the first pump upward, or adjust the current value of the second pump downward.

In response to the second input, the current value of the first pump is adjusted, the first pump is controlled to adjust the working flow rate of the first motor, the current value of the second pump is adjusted, and the second pump is controlled to adjust the working flow rate of the second motor, thereby realizing the walking deviation correction of the working machine.

In some embodiments, the working machine further includes a display screen.

The display screen can be a touch screen display or a touchpad on the terminal, the terminal can also include one or more other physical user interface devices such as a physical keyboard, mouse, and/or joystick for receiving user input.

At step 110, receiving the first input from the user includes: receiving the first input from the user to a first control displayed on the display screen.

In this embodiment, receiving the first input from the user can be represented as receiving the first input from the user to the first control or target area in the display area of the terminal display screen.

The first control is a control displayed on the display screen for performing a straight walking deviation correction action of the working machine.

In response to determining that the current working machine is in a straight running deviation situation, the user touches the corresponding first control on the interface of the display screen to realize the first input, and the terminal outputs the flow percentage in response to the first input.

At step 120, outputting the flow percentage includes: displaying the flow percentage on the display screen.

In this embodiment, the terminal displays the flow percentage on the display screen in response to the first input, which can be represented as displaying the numerical value of the flow percentage in the display area of the terminal display screen.

Taking the flow percentage displayed on the display screen as the target flow percentage as an example.

The corresponding target flow percentage can be displayed in different colors or arrows in the display area of the terminal display screen.

In the display screen, the target flow percentage of the first pump is displayed in blue, and is marked with an upward arrow and the target flow percentage value of 10%; the target flow percentage of the second pump is displayed in red, and is marked with a downwards arrow and the target flow percentage value of −10%.

At step 130, receiving the second input from the user based on the flow percentage includes: receiving the second input from the user to a second control displayed on the display screen.

In this embodiment, receiving the second input from the user can be represented as receiving the touch input from the user to the second control in the display area of the terminal display screen.

The second control is a control displayed on the display screen for adjusting the current values of the first pump and the second pump or adjusting the working flow rates of the first motor and the second motor. At step 140, adjusting the working flow rates of the first motor and the second motor includes: adjusting the working flow rates of the first motor and the second motor, and displaying the adjusted working flow rates of the first motor and the second motor on the display screen.

In this embodiment, the terminal adjusts the working flow rates of the first motor and the second motor in response to the second input, and the adjusted working flow rates of the first motor and the second motor are displayed on the display screen.

Adjusting the working flow rates of the first motor and the second motor can be achieved by adjusting the current value of the second control of the first pump and the second pump displayed on the display screen, or by adjusting the working flow rate of the second control of the first motor or the second motor.

The user adjusts the working flow rates of the first motor and the second motor through the display screen according to the flow percentage displayed on the display screen, thereby realizing the walking deviation correction function of the working machine, improving the operation convenience of the working machine, and improving the user's satisfaction.

A specific embodiment will be introduced below with reference to FIGS. 2 and 3.

Figure 2:
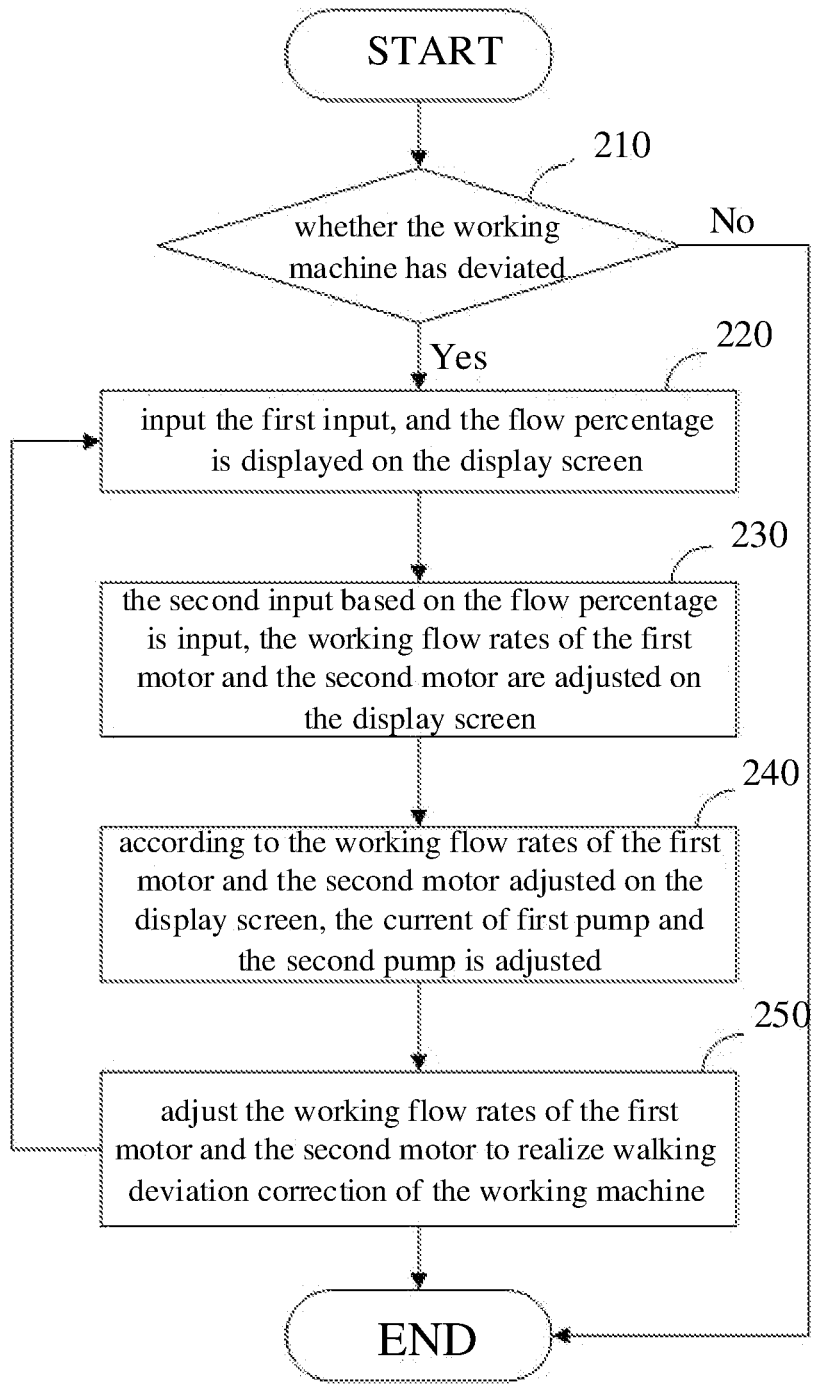
FIG. 2 is a schematic diagram showing steps of the walking deviation correction method for the working machine according to the present application.

As shown in FIG. 2, when the user operates the working machine to move straight, it is determined whether the working machine has deviated 210. In response to that the working machine has not deviated, the user continues the straight operation.

Figure 3:
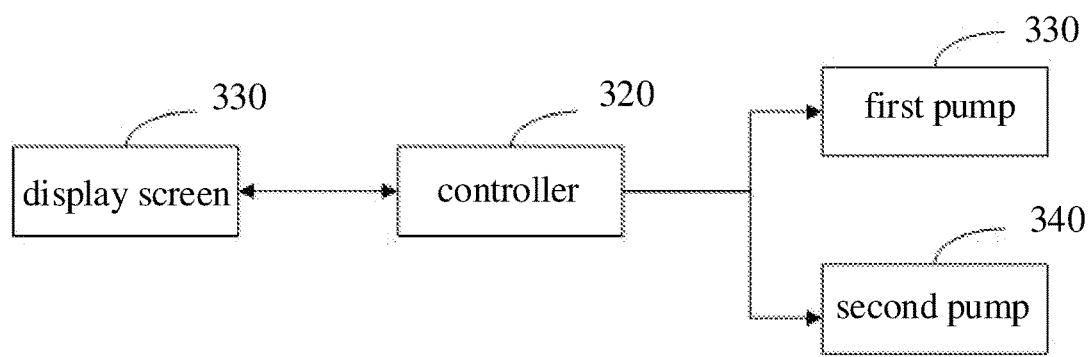
FIG. 3 is a schematic structural diagram of a system of the working machine according to the present application.

As shown in FIG. 3, the display screen 310 on the working machine is used to receive the first input and the second input. A controller 320 responds to the reception of the first input or the second input, controls the operation of obtaining the current values and the working pressure of the first pump 330 and the second pump 340, or control the operation of the current values of the first pump 330 and the second pump 340.

In response to determining that the working machine has deviated, the user inputs the first input, and the flow percentage 220 is displayed on the display screen 310.

According to the flow percentage displayed on the display screen 310, the second input based on the flow percentage is input, that is, the working flow rates 230 of the first motor and the second motor are directly adjusted on the display screen 310.

The controller adjusts the current value 240 of the first pump 330 and the second pump 340 according to the working flow rates of the first motor and the second motor adjusted by the display screen 310.

By adjusting the current values of the first pump 330 and the second pump 340, the working flow rates of the first motor and the second motor are adjusted, and the walking deviation correction of the working machine is realized.

The walking deviation correction method of the working machine provided in the present application provides reference information for the user to adjust the working flow rates of the first motor and the second motor by outputting the flow percentage, and effectively improves the accuracy, convenience and flexibility of walking deviation correction of the working machine.

The following describes the walking deviation correction device of the working machine provided by the present application. The walking deviation correction device of the working machine described below and the walking deviation correction method of the working machine described above can be mutually referenced.

Figure 4:
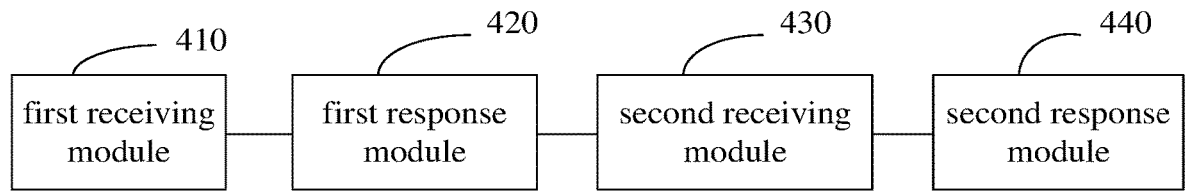
FIG. 4 is a schematic structural diagram of a walking deviation correction device for the working machine according to the present application.

As shown in FIG. 4, the walking deviation correction device of the working machine provided by the present application includes: a first receiving module 410, a first response module 420, a second receiving module 430 and a second response module 440.

The first receiving module 410 is configured to receive the first input from the user.

The first response module 420 is configured to output the flow percentage in response to the first input.

The second receiving module 430 is configured to receive the second input from the user based on the flow percentage.

The second response module 440 is configured to adjust the working flow rates of the first motor and the second motor in response to the second input.

According to the walking deviation correction device of the working machine provided in the present application, by outputting the flow percentage, it is possible to provide reference information for the user to adjust the working flow rates of the first motor and the second motor, which can effectively improve the accuracy and convenience of the walking deviation correction of the working machine, reduce the adjustment time for deviation correction, improve work efficiency, and can flexibly adjust according to the current working conditions to achieve deviation correction of the working machine.

In some embodiments, the first response module 420 is configured to output the flow percentage in response to the first input; including: obtaining the current values and working pressures of the first pump and the second pump in response to the first input; and outputting the flow percentage according to the current values and working pressures of the first pump and the second pump.

In some embodiments, the first response module 420 is configured to output the flow percentage in response to the first input; including: calculating the working flow rates of the first motor and the second motor according to the current values and working pressures of the first pump and the second pump; and outputting the flow percentage based on the working flow rates of the first motor and the second motor.

In some embodiments, the second response module 440 is configured to adjust the working flow rates of the first motor and the second motor in response to the second input, including: adjusting the current values of the first pump and the second pump in response to the second input; controlling the first pump to adjust the working flow rate of the first motor based on the current value of the first pump; and controlling the second pump to adjust the working flow rate of the second motor based on the current value of the second pump.

In some embodiments, the first receiving module 410 is configured to receive the first input from the user to the first control displayed on the display screen; the first response module 420 is configured to display the flow percentage on the display screen in response to the first input; the second receiving module 430 is configured to receive the second input from the user to the second control displayed on the display screen; and the second response module 440 is configured to adjust the working flow rates of the first motor and the second motor in response to the second input. The adjusted working flow rates of the first motor and the second motor are displayed on the display screen.

In some embodiments, the first response module 420 outputs the flow percentage, including: outputting the current flow percentage of the first pump and the second pump; or outputting the target flow percentage of the first pump and the second pump.

The present application also provides a working machine, including: a first pump, a second pump, a first motor, a second motor and the walking deviation correction device of the working machine as described above. The first pump is connected to the first motor, the second pump is connected to the second motor, and the first motor is configured to drive the first running wheel, the second motor is configured to drive the second running wheel.

According to the working machine provided in the present application, by outputting the flow percentage through the walking deviation correction device, it is possible to provide reference information for the user to adjust the working flow rates of the first motor and the second motor, which can effectively improve the accuracy and convenience of the walking deviation correction of the working machine, reduce the adjustment time for deviation correction, improve work efficiency, and can flexibly adjust according to the current working conditions.

Figure 5:
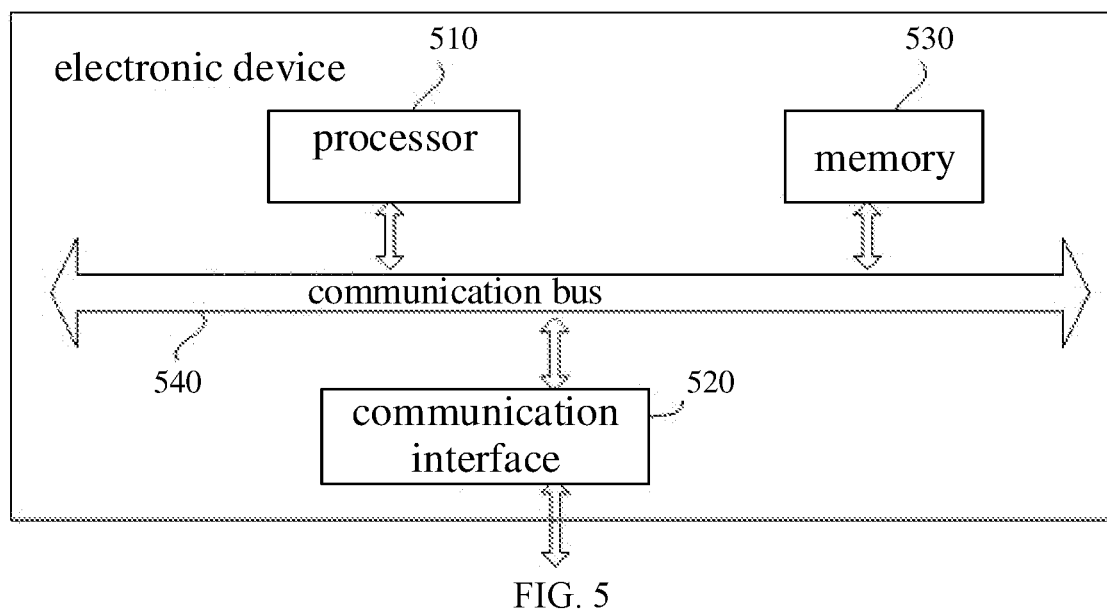
FIG. 5 is a schematic structural diagram of an electronic device according to the present application.

FIG. 5 illustrates a schematic diagram of the physical structure of an electronic device. As shown in FIG. 5, the electronic device can include: a processor 510, a communication interface 520, a memory 530 and a communication bus 540. The processor 510, the communication interface 520 and the memory 530 perform communication with each other through the communication bus 540. The processor 510 can call logical instructions in the memory 530 to execute the walking deviation correction method of the working machine. The method includes: receiving the first input from the user; outputting the flow percentage in response to the first input; receiving the second input from the user based on the flow percentage; and adjusting the working flow rates of the first motor and the second motor in response to the second input.

In addition, the above-mentioned logical instructions in the memory 530 can be implemented in the form of software functional units and can be stored in a computer-readable storage medium when sold or used as an independent product. Based on this understanding, the technical solution of the present application, in essence, or the part that contributes to the related technology or the part of the technical solution, can be embodied in the form of a software product. The computer software product is stored in a storage medium and includes several instructions to cause a computer device (which can be a personal computer, a server, or a network device, etc.) to execute all or part of the steps of the methods of various embodiments of the present application. The aforementioned storage medium includes U flash drive, mobile hard disk, read only memory (ROM), random access memory (RAM), magnetic disk or optical disk and other medium that can store program code.

On the other hand, the present application also provides a computer program product. The computer program product includes a computer program stored on a non-transitory computer-readable storage medium. The computer program includes program instructions. When the program instructions are executed by the computer, the computer can execute the walking deviation correction method of the working machine provided by the above methods. The method includes: receiving the first input from the user; outputting the flow percentage in response to the first input; receiving the second input from the user based on the flow percentage; and adjusting the working flow rates of the first motor and the second motor in response to the second input.

On the other hand, the present application also provides a non-transitory computer-readable storage medium on which a computer program is stored. The computer program is implemented when executed by the processor to perform the above-mentioned walking deviation correction method of the working machine. The method includes: receiving the first input from the user; outputting the flow percentage in response to the first input; receiving the second input from the user based on the flow percentage; and adjusting the working flow rates of the first motor and the second motor in response to the second input.

The device embodiments described above are only illustrative. The units described as separate components can or cannot be physically separated. The components shown as units can be or cannot be physical units, that is, they can be located in one place, or distributed across multiple network units. Some or all of the modules can be selected according to actual needs to achieve the purpose of the solution of this embodiment. Those skilled in the art can understand and implement without any creative effort.

Through the above description of the embodiments, those skilled in the art can clearly understand that various embodiments can be implemented by software and necessary general hardware platforms, and of course, they can also be implemented through hardware. Based on this understanding, the above technical solutions, in essence, or the parts that contribute to the existing technology, can be embodied in the form of software products. The computer software product can be stored in a computer-readable storage medium, such as ROM/RAM, magnetic disc, optical disk, etc., including several instructions to cause a computer device (which can be a personal computer, a server, or a network device, etc.) to execute the methods described in various embodiments or certain parts of the embodiments.

Finally, it should be noted that the above embodiments are only used to illustrate the technical solution of the present application, but not to limit it. Although the present application has been described in detail with reference to the foregoing embodiments, those skilled in the art should understand that the technical solutions described in the foregoing embodiments can be modified, or equivalent substitutions are made to some of the technical features; however, these modifications or substitutions do not cause the essence of the corresponding technical solutions to deviate from the spirit and scope of the technical solutions in the embodiments of the present application.

What is claimed is:

1. A walking deviation correction method for a working machine, wherein the working machine comprises: a first pump, a second pump, a first motor and a second motor; the first pump is connected to the first motor, the second pump is connected to the second motor, the first motor is configured to drive a first running wheel, and the second motor is configured to drive a second running wheel;

wherein the method comprises:
receiving a first input from a user;
outputting a flow percentage in response to the first input, wherein the flow percentage is a percentage coefficient of working flow rates of the first pump and the second pump to a rated value;
receiving a second input from the user based on the flow percentage; and
adjusting working flow rates of the first motor and the second motor in response to the second input.

2. The walking deviation correction method for the working machine according to claim 1, wherein the outputting the flow percentage in response to the first input comprises:
obtaining current values and working pressures of the first pump and the second pump in response to the first input; and
outputting the flow percentage according to the current values and the working pressures of the first pump and the second pump.

3. The walking deviation correction method for the working machine according to claim 2, wherein the outputting the flow percentage according to the current values and the working pressures of the first pump and the second pump comprises:
calculating the working flow rates of the first motor and the second motor according to the current values and the working pressures of the first pump and the second pump; and outputting the flow percentage based on the working flow rates of the first motor and the second motor.

4. The walking deviation correction method for the working machine according to claim 1, wherein the adjusting the working flow rates of the first motor and the second motor in response to the second input comprises:
adjusting current values of the first pump and the second pump in response to the second input;
controlling the first pump to adjust the working flow rate of the first motor based on the current value of the first pump; and
controlling the second pump to adjust the working flow rate of the second motor based on the current value of the second pump.

5. The walking deviation correction method for the working machine according to claim 1, wherein the working machine further comprises a display screen;
the receiving the first input from the user comprises: receiving the first input from the user to a first control displayed on the display screen;
the outputting the flow percentage comprises: displaying the flow percentage on the display screen;
the receiving the second input from the user based on the flow percentage comprises: receiving the second input from the user to a second control displayed on the display screen; and
the adjusting the working flow rates of the first motor and the second motor comprises: adjusting the working flow rates of the first motor and the second motor, and displaying the adjusted working flow rates of the first motor and the second motor on the display screen.

6. The walking deviation correction method for the working machine according to claim 1, wherein the outputting the flow percentage comprises:
outputting current flow percentages of the first pump and the second pump; or
outputting target flow percentages of the first pump and the second pump.

7. A walking deviation correction device for a working machine, comprising:
a first receiving module configured to receive a first input from a user;
a first response module configured to output a flow percentage in response to the first input, wherein the flow percentage is a percentage coefficient of working flow rates of a first pump and a second pump to a rated value, the first pump is connected to a first motor, and the second pump is connected to a second motor;
a second receiving module configured to receive a second input from the user based on the flow percentage; and
a second response module configured to adjust working flow rates of a first motor and a second motor in response to the second input.

8. A working machine, comprising:
a first pump;
a second pump;
a first motor connected to the first pump;
a second motor connected to the second pump; and
the walking deviation correction device for the working machine according to claim 7,
wherein the first motor is configured to drive a first running wheel, and the second motor is configured to drive a second running wheel.

9. An electronic device, comprising a memory, a processor, and a computer program stored on the memory and executable on the processor, wherein steps of the walking deviation correction method for the working machine according to claim 1 are implemented when the program is executed by the processor.

10. A non-transitory computer-readable storage medium, wherein a computer program is stored on the non-transitory computer-readable storage medium, and steps of the walking deviation correction method for the working machine according to claim 1 are implemented when the computer program is executed by a processor.

* * * * *